US009667920B2

(12) United States Patent
Deng

(10) Patent No.: US 9,667,920 B2
(45) Date of Patent: May 30, 2017

(54) HYBRID ACTIVE AND PASSIVE PEOPLE METERING FOR AUDIENCE MEASUREMENT

(71) Applicant: The Nielsen Company (US), LLC, New York, NY (US)

(72) Inventor: Kevin Keqiang Deng, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/935,748

(22) Filed: Nov. 9, 2015

(65) Prior Publication Data
US 2016/0065902 A1 Mar. 3, 2016

Related U.S. Application Data

(63) Continuation of application No. 13/431,624, filed on Mar. 27, 2012, now Pat. No. 9,185,456.

(51) Int. Cl.
H04N 7/18 (2006.01)
H04H 60/31 (2008.01)
H04N 21/442 (2011.01)

(52) U.S. Cl.
CPC ............... H04N 7/18 (2013.01); H04H 60/31 (2013.01); H04N 21/44218 (2013.01)

(58) Field of Classification Search
None
See application file for complete search history.

(56) References Cited

U.S. PATENT DOCUMENTS

| 3,841,763 A | 10/1974 | Lewis |
| 4,779,198 A | 10/1988 | Lurie |
| 4,807,027 A | 2/1989 | Muto |
| 5,987,154 A | 11/1999 | Gibbon et al. |
| 6,263,088 B1 | 7/2001 | Crabtree et al. |
| 6,295,367 B1 | 9/2001 | Crabtree et al. |
| 6,577,346 B1 | 6/2003 | Perlman |
| 6,580,372 B1 | 6/2003 | Harris |

(Continued)

OTHER PUBLICATIONS

United States Patent and Trademark Office, "Notice of Allowance," issued in connection with U.S. Appl. No. 13/431,626 on Jan. 17, 2014, 11 pages.

(Continued)

Primary Examiner — Eileen Adams
(74) Attorney, Agent, or Firm — Hanley, Flight & Zimmerman, LLC

(57) ABSTRACT

Hybrid active and passive people metering for audience measurement is disclosed. Example audience identification methods disclosed herein include detecting a trigger signal output from a media device meter. Disclosed example methods also include, in response to determining that an image captured by an image sensor does not correspond to any one of a plurality of recognized audiences, passing the trigger signal to an input of a people meter to cause the people meter to output a prompt for entry of audience identification information. Disclosed example methods further include, in response to determining that the image corresponds to a first one of the plurality of recognized audiences, blocking the trigger signal from being passed to the input of the people meter to prevent the people meter from outputting the prompt.

20 Claims, 7 Drawing Sheets

(56) References Cited

U.S. PATENT DOCUMENTS

| | | |
|---|---|---|
| 6,633,651 B1 | 10/2003 | Hirzalla et al. |
| 6,710,822 B1 | 3/2004 | Walker et al. |
| 6,771,818 B1 | 8/2004 | Krumm et al. |
| 6,930,687 B2 | 8/2005 | Grosvenor et al. |
| 6,943,724 B1 | 9/2005 | Brace et al. |
| 6,985,623 B2 | 1/2006 | Prakash et al. |
| 6,999,600 B2 | 2/2006 | Venetianer et al. |
| 7,092,566 B2 | 8/2006 | Krumm |
| 7,193,531 B2 | 3/2007 | Ito et al. |
| 7,203,338 B2 | 4/2007 | Ramaswamy et al. |
| 7,466,844 B2 | 12/2008 | Ramaswamy et al. |
| 7,472,134 B2 | 12/2008 | Kaku |
| 7,609,853 B2 | 10/2009 | Ramaswamy et al. |
| 7,647,605 B2 | 1/2010 | Lu et al. |
| 7,733,224 B2 | 6/2010 | Tran |
| 7,926,073 B2 | 4/2011 | Buonasera et al. |
| 8,054,177 B2 | 11/2011 | Graves et al. |
| 8,091,100 B2 | 1/2012 | Donato |
| 2002/0118287 A1 | 8/2002 | Grosvenor et al. |
| 2003/0020743 A1 | 1/2003 | Barbieri |
| 2004/0019608 A1 | 1/2004 | Obrador |
| 2006/0015492 A1 | 1/2006 | Keating et al. |
| 2006/0153296 A1 | 7/2006 | Deng |
| 2007/0124337 A1* | 5/2007 | Flam ............... G06Q 10/06 |
| 2008/0046925 A1 | 2/2008 | Lee et al. |
| 2008/0068622 A1 | 3/2008 | Deng et al. |
| 2008/0118106 A1 | 5/2008 | Kilambi et al. |
| 2008/0273795 A1 | 11/2008 | Ofek et al. |
| 2009/0055854 A1 | 2/2009 | Wright et al. |
| 2009/0123025 A1 | 5/2009 | Deng et al. |
| 2009/0245573 A1* | 10/2009 | Saptharishi ....... G06K 9/00771 382/103 |
| 2009/0290791 A1 | 11/2009 | Holub et al. |
| 2010/0046797 A1 | 2/2010 | Strat et al. |
| 2010/0070523 A1 | 3/2010 | Delgo et al. |
| 2010/0246965 A1 | 9/2010 | Epshtein et al. |
| 2011/0016006 A1* | 1/2011 | Opdycke ............. G06Q 30/02 705/14.73 |
| 2011/0243459 A1 | 10/2011 | Deng |
| 2011/0249004 A1 | 10/2011 | Cheswick |
| 2011/0292232 A1 | 12/2011 | Zhang et al. |
| 2012/0002868 A1 | 1/2012 | Loui et al. |
| 2012/0020559 A1 | 1/2012 | Deng et al. |
| 2012/0027299 A1 | 2/2012 | Ran |
| 2012/0324496 A1* | 12/2012 | Donato ............... H04H 60/45 725/14 |
| 2013/0051670 A1 | 2/2013 | Das et al. |
| 2013/0258084 A1 | 10/2013 | Deng |
| 2013/0259323 A1 | 10/2013 | Deng |
| 2014/0254947 A1 | 9/2014 | Deng |

OTHER PUBLICATIONS

United States Patent and Trademark Office, "Office Action," issued in connection with U.S. Appl. No. 13/431,626 on Sep. 13, 2013, 25 pages.

Khan, W. et al., "Signature Based Approach for Image Retrieval Using Color Histogram and Wavelet Transform", International Journal of Soft Computing and Engineering, vol. 1, Mar. 2011, 4 pages.

United States Patent and Trademark Office, "Notice of Allowance", issued in connection with U.S. Appl. No. 14/281,429, dated Sep. 16, 2015 (13 pages).

United States Patent and Trademark Office, "Non-Final Office Action", issued in connection with U.S. Appl. No. 13/431,624, dated Oct. 9, 2014 (25 pages).

United States Patent and Trademark Office, "Final Office Action", issued in connection with U.S. Appl. No. 13/431,624, dated Mar. 4, 2015 (26 pages).

United States Patent and Trademark Office, "Notice of Allowance", issued in connection with U.S. Appl. No. 13/431,624, dated Jun. 26, 2015 (8 pages).

* cited by examiner

HYBRID ACTIVE AND PASSIVE PEOPLE METERING FOR AUDIENCE MEASUREMENT

RELATED APPLICATION(S)

This patent arises from a continuation of U.S. patent application Ser. No. 13/431,624 (now U.S. Patent No. 9,185,456), which is entitled "HYBRID ACTIVE AND PASSIVE PEOPLE METERING FOR AUDIENCE MEASUREMENT" and which was filed on Mar. 27, 2012. U.S. patent application Ser. No. 13/431,624 is hereby incorporated by reference in its entirety.

FIELD OF THE DISCLOSURE

This disclosure relates generally to audience measurement and, more particularly, to hybrid active and passive people metering for audience measurement.

BACKGROUND

Audience measurement systems typically include one or more device meters to monitor the media presented by one or more media presentation devices located at a monitored site. Many such audience measurement systems also include one or more people meters to obtain information characterizing the composition(s) of the audience(s) in the vicinity of the media presentation device(s) being monitored. Prior people meters generally fall into two categories, namely, active people meters or passive people meters. An active people meter obtains audience information by actively prompting an audience member to press an input key or otherwise enter information via the people meter. A passive people meter obtains audience information by passively monitoring the audience, usually by using facial recognition techniques to identify the individual audience members included in the audience.

DETAILED DESCRIPTION

Figure 1:
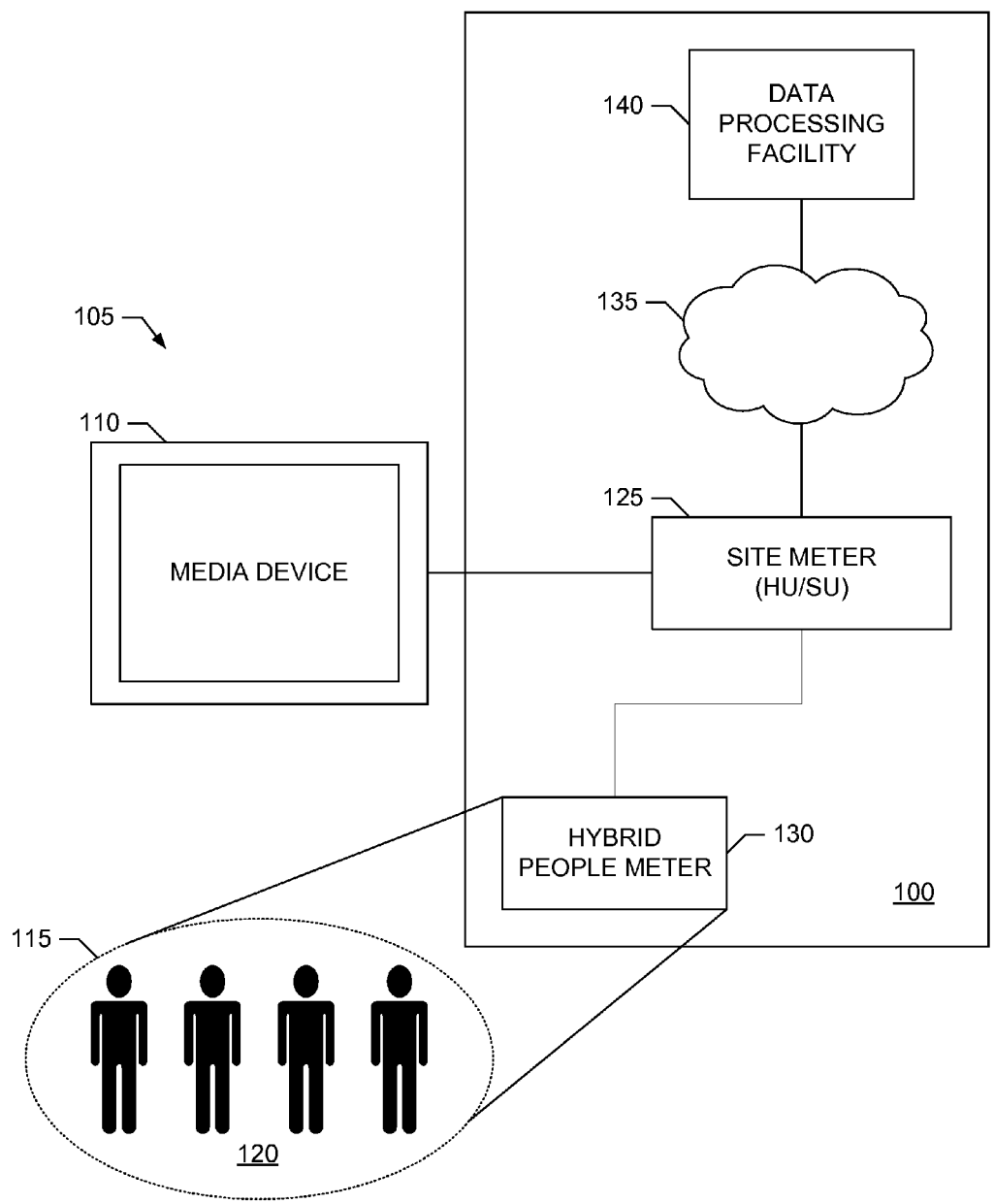
FIG. 1 is a block diagram of an example audience measurement system employing hybrid people metering as disclosed herein.

Example methods, apparatus and articles of manufacture to implement hybrid active and passive people metering for audience measurement are disclosed herein. As noted above, prior people meters for audience measurement are generally either active or passive. An active people meter obtains audience information by actively prompting an audience to enter information for audience member identification. A passive people meter obtains audience information passively, usually by capturing images of the audience using a camera and then employing facial recognition to identify the individual audience members included in the audience. Active people meters are generally simpler and less costly than passive people meters, but are prone to measurement error due to audience fatigue over time, lack of audience compliance, etc. Passive people meters do not rely on audience compliance and, thus, can be more reliable, but also require substantially more computing resources to implement accurate facial recognition processing. The accuracy of the passive people meters may also depend on their cameras being properly positioned to capture images clearly depicting the faces of the audience members. As such, passive people meters are often too costly to deploy in a statistically significant number of monitored sites and/or are unable to be used in some sites to be monitored due to restrictions on camera placement.

In contrast, people metering examples disclosed herein employ a hybrid of active and passive people metering, which can improve measurement accuracy and reduce reliance on audience compliance, but without incurring the costs associated with facial recognition techniques or exhibiting the camera placement restrictions associated with prior passive people meters, in at least some examples. Example methods disclosed herein to perform people metering for audience measurement include obtaining a sequence of one or more images depicting a scene in which an audience is expected to be present. The example methods also include comparing an image sequence signature representative of the image sequence with a set of reference signatures to determine a comparison result. The example methods further include controlling audience prompting performed by a people meter based on the comparison result. For example, such controlling of the audience prompting performed by the people meter can include either disabling prompting during a current prompting interval or reducing a probability that the people meter will initiate an audience prompt during the current prompting interval when the comparison result indicates that the image sequence signature matches at least one reference signature in the set of reference signatures.

In some disclosed examples, such controlling of the audience prompting performed by the people meter includes controlling the audience prompting performed by the people meter based on a first configuration when the comparison result indicates that the image sequence signature does not match at least one reference signature in the set of reference signatures. However, the audience prompting performed by the people meter is controlled based on a second configuration, which is different from the first configuration, when the comparison result indicates that the image sequence signature matches at least one of the reference signatures. For example, the first configuration may cause the audience prompting performed by the people meter to occur at a first prompting frequency. In such examples, the obtaining of the image is triggered to occur prior to when the people meter is to initiate an audience prompt during a current prompting interval (e.g., based on the first configuration). Then, if the comparison result indicates that the image sequence signature matches at least one of the reference signatures, such example methods determine, based on the second configuration, whether to permit the audience prompt to still be initiated by the people meter during the current prompting interval. For example, the second configuration can specify that: (1) audience prompting during the current prompting interval is to be disabled when the comparison result indicates that the image sequence signature matches at least one of the reference signatures, or (2) audience prompting during the current prompting interval is to be invoked with a probability less than one when the comparison result indicates that the image sequence signature matches at least one of the reference signatures.

In some disclosed examples, the set of reference signatures can be representative of a respective set of prior images obtained during prior prompting intervals. Furthermore, each such reference signature can be associated with a respective set of demographic data obtained in response to audience prompting performed by the people meter during the prior prompting intervals. In such examples, disclosed methods can further include using the demographic information associated with first reference signature for audience identification during a current prompting interval (e.g., instead of actively prompting the audience) when the comparison result indicates that the input image matches a first reference signature in the set of reference signatures.

To obtain the set of reference signatures, some disclosed example methods include causing the people meter to initiate an audience prompt during a current prompting interval. Such example methods also include associating demographic information obtained in response to the audience prompt with the image sequence signature. In such examples, the image sequence signature is then included in the set of reference signatures for comparison with a second image sequence signature obtained during a subsequent prompting interval.

Example apparatus to implement hybrid active and passive people metering for audience measurement, and example articles of manufacture (e.g., storage media) storing machine readable instructions which, when executed, cause example machine(s) to perform hybrid active and passive people metering for audience measurement, are also disclosed herein.

Turning to the figures, a block diagram of an example audience metering system 100 employing hybrid active and passive people metering as disclosed herein is illustrated in FIG. 1. The example audience measurement system 100 supports monitoring of media content exposure to audiences at one or more monitored sites, such as the example monitored site 105 illustrated in FIG. 1. The monitored site 105 includes an example media presentation device 110 and an example audience area 115. The audience area 115 corresponds to one or more locations at the monitored site 105 in which an audience 120 is expected to be present when consuming media content (e.g., viewing and/or hearing the media content, interacting with the content, etc.) presented by the media presentation device 110. The audience area 115 can include, but is not limited to, a room containing the media presentation device 110, a sitting area in front of the media presentation device 110, etc. Although the example of FIG. 1 illustrates one monitored site 105, hybrid active and passive people metering as disclosed herein can be used in audience measurement systems 100 supporting any number of monitored sites 105.

The audience measurement system 100 of the illustrated example includes an example site meter 125, also referred to as a site unit 125, a home unit 125, etc., to monitor media content presented by the media presentation device 110. To support hybrid active and passive people metering at the monitored site 105 in accordance with the examples described herein, the example audience measurement system 100 of FIG. 1 also includes an example hybrid people meter 130, which is described in greater detail below. In the illustrated example, the site meter 125 determines audience measurement data characterizing media content exposure at the monitored site 105 by combining metering data (also referred to as content metering data, content monitoring data, content measurement data, tuning data, etc.), which is determined by monitoring the media presentation device 110, with audience identification data (also referred to as demographic data, people meter data, etc.), which is provided by the hybrid people meter 130. The audience measurement meter 125 then stores and reports this audience measurement data via an example network 135 to an example data processing facility 140. The data processing facility 140 performs any appropriate post-processing of the audience measurement data to, for example, determine audience ratings information, identify targeted advertising to be provided to the monitored site 105, etc. In the illustrated example, the network 130 can correspond to any type(s) and/or number of wired and/or wireless data networks, or any combination thereof.

In the illustrated example, the media presentation device 110 monitored by the site meter 125 can correspond to any type of audio, video and/or multimedia presentation device capable of presenting media content audibly and/or visually. For example, the media presentation device 110 can correspond to a television and/or display device that supports the National Television Standards Committee (NTSC) standard, the Phase Alternating Line (PAL) standard, the Systeme Electronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As another example, the media presentation device 110 can correspond to a multimedia computer system, a personal digital assistant, a cellular/mobile smartphone, a radio, etc.

The site meter 125 included in the audience measurement system 100 of the illustrated example can correspond to any type of metering device capable of monitoring media content presented by the media presentation device 110. As such, the site meter 125 may utilize invasive monitoring involving one or more physical connections to the media presentation device 110, and/or non-invasive monitoring not involving any physical connection to the media presentation device 110. For example, the site meter 125 may process audio signals obtained from the media presentation device 110 via a microphone and/or a direct cable connection to detect content and/or source identifying audio codes and/or audio watermarks embedded in audio portion(s) of the media content presented by the media presentation device 110. Additionally or alternatively, the site meter 125 may process video signals obtained from the media presentation device 110 via a camera and/or a direct cable connection to detect content and/or source identifying video codes and/or video watermarks embedded in video portion(s) of the media content presented by the media presentation device 110. Additionally or alternatively, the site meter 125 may process the aforementioned audio signals and/or video signals to generate respective audio and/or video signatures from the media content presented by the media presentation device 110, which can be compared to reference signatures to perform source and/or content identification. Any other type(s) and/or number of media content monitoring techniques can additionally or alternatively be supported by the site meter 125.

Figure 2:
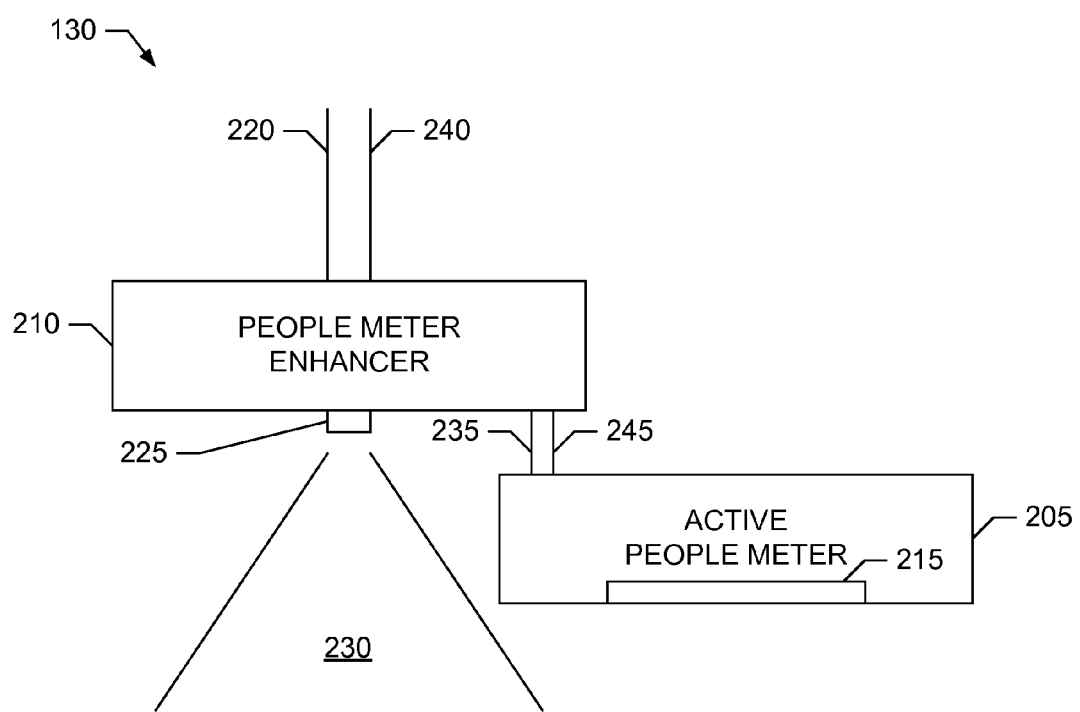
FIG. 2 is a block diagram of an example hybrid people meter that can be used to implement the example audience measurement system of FIG. 1.

In the example of FIG. 1, the audience measurement system 100 includes the example hybrid people meter 130 to capture information about the audience 120 that is consuming the media content presented by the media presentation device 110. A block diagram of an example implementation of the hybrid people meter 130 of FIG. 1 is illustrated in FIG. 2. The example hybrid people meter 130 of FIG. 2 includes an active people meter component 205 (also referred to as the active component 205, the active people meter 205, etc.) and an example people meter enhancement component 210 (also referred to as the enhancement component 210, the passive component 210, the people meter enhancer 210, etc.). With reference to FIGS. 1 and 2, and as described in greater detail below, the active people meter component 205 prompts the audience 120 to actively provide audience identification information via an example input interface 215. For example, the active component 205 of the hybrid people meter 130 may cause a prompting indicator to be displayed by the hybrid people meter 130 during a current prompting interval. In such examples, the audience 120 can respond to the prompting indicator by using the input interface 215 to identify which of a possible set of audience members are present in the audience 120.

In the illustrated example, an example prompting trigger signal 220 is provided by the site meter 125 (not shown in FIG. 2) to control the prompting intervals during which the active people meter component 205 is to prompt the audience 120 to actively provide audience identification information. The prompting trigger signal 220 is activated by the site meter 125 to cause audience prompting based on, for example, a pre-configured prompting interval corresponding to a pre-configured prompting frequency, a prompting interval specified during configuration of the hybrid people meter 130 and corresponding to a specified prompting frequency, and/or based on monitored characteristics of the media content being presented by the media presentation device 110 (e.g., to cause prompting to occur upon detection of events, such as channel change events, content transition events, audio muting/un-muting events, etc.), etc.

The example hybrid people meter 130 of FIG. 2 includes the example people meter enhancement component 210 to control the audience prompting performed by the active people meter component 205. For example, the people meter enhancement component 210 can reduce the frequency of audience prompting by passively determining audience identification information for the audience 120. In some examples, the enhancement component 210 of the hybrid people meter 130 includes an example imaging sensor 225, such as a camera, from which images are obtained that depict a scene in which the audience 120 is expected to be present. Accordingly, an image that is taken to be representative of audience 120, such as an image taken of the audience area 115, is also referred to herein as an audience scene. For example, the imaging sensor 225 of the hybrid people meter 130 can be positioned such that its field of view 230 includes the audience area 115. However, because people meter enhancement component 210 does not rely on facial recognition processing, it is not necessary for the imaging sensor 225 to be placed such that the audience 120 is facing the imaging sensor 225, thereby removing the camera placement restrictions associated with prior passive people meters. In such examples, the people meter enhancement component 210 uses the captured images to attempt to recognize an audience scene as corresponding to (e.g., matching) a past audience scene that has already been identified, which is referred to herein as a reference audience scene. If the enhancement component recognizes the audience scene, the hybrid people meter 130 can use audience information already associated with the corresponding reference audience scene to infer or otherwise identify the audience 120. Additionally, if the audience scene is recognized, the people meter enhancement component can block active prompting from being performed by the hybrid people meter 130 during a current prompting interval, or reduce the probability of active prompting being performed by the hybrid people meter 130 during the current prompting interval (e.g., to enable verification of the reference audience's identification information).

For example, in the hybrid people meter 130 of FIG. 2, the people meter enhancement component 210 can be communicatively coupled to the prompting trigger signal 220 output by the site meter 125 and intended for the active people meter component 205. In such examples, the people meter enhancement component 210 provides an enhanced prompting trigger signal 235 to the active people meter component 205 that is a gated or otherwise controlled version of the prompting trigger signal 220. In the illustrated example, the people meter enhancement component 210 gates (controls) the prompting trigger signal 220 by allowing the prompting trigger signal 220 to pass to the active people meter component 205 if the people meter enhancement component 210 does not recognize one or more of the audience scenes being processed, and/or is unable to infer the audience 120 from the audience scenes. However, if the people meter enhancement component 210 does recognize the audience scenes and is able to infer the audience 120, then the enhancement component 210 gates the prompting trigger signal 220 by blocking the prompting trigger signal 220 entirely, or allowing the prompting trigger signal 220 to pass, but with a probability less than one (which may be specified as a configuration parameter). Thus, by employing scene recognition processing as described in greater detail below, the people meter enhancement component 210 can reduce the frequency with which the audience 120 is actively prompted by the hybrid people meter 130.

In the illustrated example of FIG. 2, the enhancement component 210 of the hybrid people meter 130 reports audience identification data 240 to the site meter 125 during the reporting intervals corresponding to the prompting trigger signal 220. In the illustrated example, when the people meter enhancement component is able to infer that the audience 120 corresponds to (e.g., matches) a reference audience scene, the audience identification data 240 reported by the enhancement component 210 includes the reference audience identification information associated with the matching reference audience scene. However, when the people meter enhancement component 210 does not recognize the audience scene(s) and, thus, is unable to infer the audience 120, then the audience identification data 240 reported by the enhancement component 210 includes active audience identification data 245 obtained from the active people meter component 205 (e.g., by prompting the audience 120 to actively enter the audience identification data 245 via the input interface 215). In some examples, when the people meter enhancement component 210 infer the audience 120 from a matching reference audience scene, the audience identification data 240 may include both the reference audience identification information and the active audience identification data 245 to enable verification of the reference audience identification information already associated with the matching reference audience scene (e.g., such as when the enhancement component 210 enables audience prompting with a probability less than one, as described above).

Figure 3:
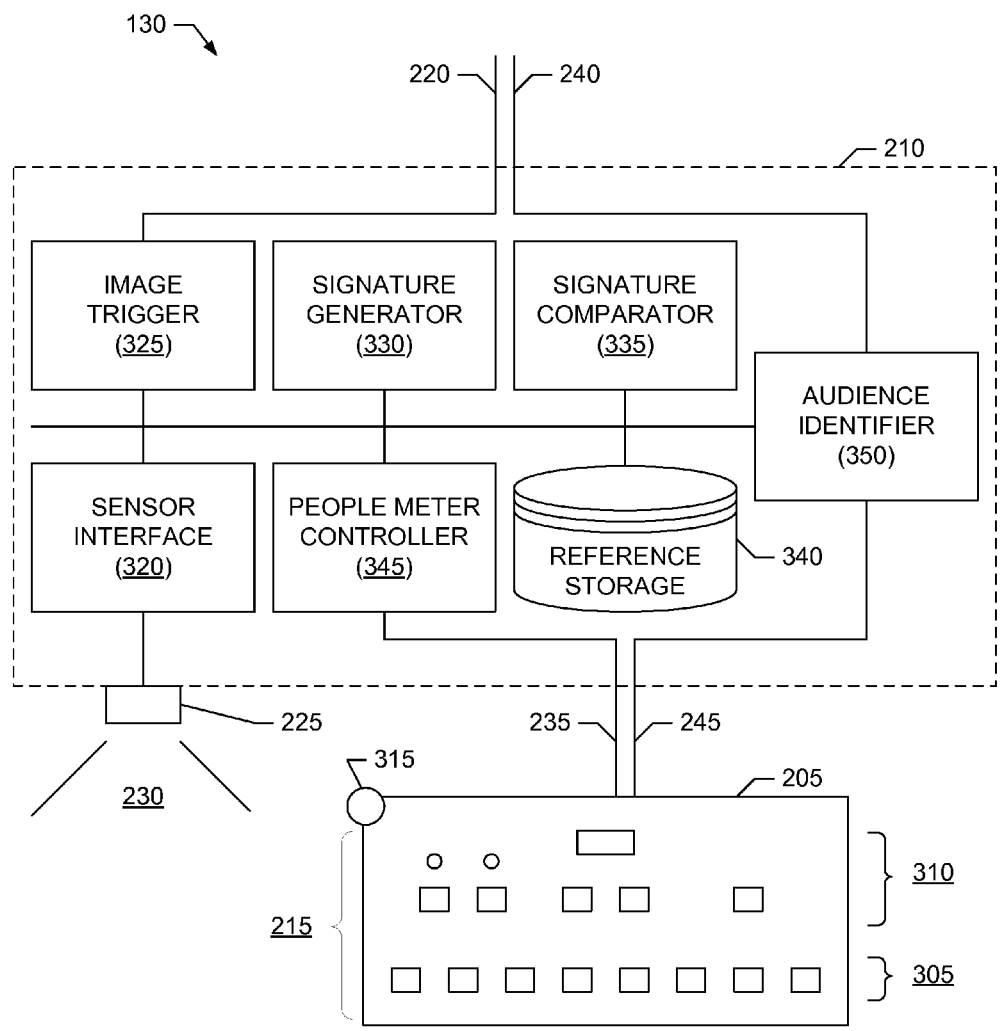
FIG. 3 is a block diagram illustrating an example implementation of the hybrid people meter of FIG. 2.

A more detailed block diagram of the example implementation of the hybrid people meter 130 of FIG. 2 is illustrated in FIG. 3. The example hybrid people meters 130 of FIGS. 2 and 3 include many elements in common. As such, like elements in FIGS. 2 and 3 are labeled with the same reference numerals. The detailed descriptions of these like elements are provided above in connection with the discussion of FIG. 2 and, in the interest of brevity, are not repeated in the discussion of FIG. 3.

Turning to the illustrated example of FIG. 3, the active component 205 of the hybrid people meter 130 includes the user interface 215 via which audience identification information can be obtained from the audience 120. In the illustrated example, the user interface 215 includes a set of audience keys 305, such that each audience key 305 is assigned to represent a respective possible member of the audience 120. Additional interface components 310, such as additional key(s), push buttons, displays, etc., are included in the user interface 215 to enable new/guest audience members to be enrolled and associated with a particular audience key 305 of the hybrid people meter 130. For example, the additional interface components 310 may permit a new/guest audience member to input demographic information, such as gender, age, etc., to the hybrid people meter 130, after which the new/guest audience member is associated with one of the audience keys 305. The interface 215 can also be implemented on a remote device, which is not depicted in FIG. 3, to enable the audience 120 to interact with the active component 205 remotely In the example hybrid people meter 130 of FIG. 3, the active people meter component 205 prompts the audience 120 to enter audience identification information via the input interface 215. For example, the active people meter component 205 may initiate an audience prompt during a current prompting interval by activating an example prompting indicator 315, which may correspond to a flashing light, a sound emitted by a speaker, etc. In response to perceiving the activated prompting indicator 315, the members of the audience 120 press their respective audience key(s) 305 on the active people meter component 205 (and/or the counterpart key(s) on a remote device in communication with the active people meter component 205) to indicate their presence in the audience area 115. As described above, audience prompting by the active people meter component 205 is controlled by the enhanced prompting trigger signal 235 provided by the people meter enhancement component 210, and the results of the audience prompting are reported in the active audience identification data 245 returned to the people meter enhancement component 210.

In the example hybrid people meter 130 of FIG. 3, the people meter enhancement component 210 includes the imaging sensor 225 (e.g., a camera) to obtain images depicting scenes in which the audience 120 is expected to be present. As such, the people meter enhancement component 210 of FIG. 3 includes an example sensor interface 320 to control the imaging sensor 225. For example, the sensor interface 320 can be implemented using any appropriate type(s) and/or number of interface(s) to enable controlling when the imaging sensor 225 is to capture images, to enable receiving the captured images, and to enable storing the captured images. In the example of FIG. 3, the people meter enhancement component 210 includes an example image trigger 325 to trigger when the sensor interface 320 is to cause the imaging sensor 225 to capture a new image, or a new sequence of images, of the audience area 115. In the illustrated example, the image trigger 325 uses the prompting trigger signal 220 controlled by the site meter 125 to determine when to trigger capturing of a new image or a new sequence of images. For example, the image trigger 325 can cause one or more images of the audience area 115 to be captured each time that the prompting trigger signal 220 is activated, thereby causing a new image sequence (containing one or more new images) to be obtained during each prompting interval as defined by the prompting trigger signal 220.

In some examples, the audience 120 also enters audience identification information through the interface 205 of the active people meter component 205 without being prompted, such as when the composition of the audience 120 changes (e.g., due to addition of new audience member(s) and/or removal of existing audience member(s)). In such examples, the people meter enhancement component 210 may invoke the image trigger 325 to begin capturing image(s) of the audience area 115 whenever entry of audience identification information via the active people meter component 205 is detected, even if the prompting trigger signal 220 has not been asserted.

The people meter enhancement component 210 uses the sequence of one or more images obtained by the imaging sensor 225 to perform audience scene recognition, also referred to as audience inference, during a current prompting interval. For example, the people meter enhancement component 210 compares the image(s) obtained by the imaging sensor 225 during a current prompting interval, and which correspond to the audience scene(s) obtained during the current prompting interval, with reference images representative of respective reference audience scenes that were identified during prior prompting intervals. If the current image sequence matches a reference audience scene, the people meter enhancement component 210 infers that the audience 120 depicted in the current image sequence corresponds to the reference audience scene. In such cases, the people meter enhancement component 210 can use reference audience identification information already associated with the matching reference audience scene to infer the audience 120 depicted in the current image sequence, and which is present in the audience area 115 during the current prompting interval. Additionally, and as described above, the people meter enhancement component 210 can block audience prompting or reduce the probability of audience prompting during the current prompting interval when the current image sequence is determined to match a reference audience scene.

The example people meter enhancement component 210 of FIG. 3 employs image sequence signatures and image signature comparison to determine whether the current image sequence obtained by the imaging sensor 225 matches one or more reference scenes representative of a reference audience. Generally, an image sequence signature is a proxy representative of the associated image sequence or a particular (e.g., key) image from the sequence, and can take the form of, for example, one or more digital values, a waveform, etc. In some examples, the image sequence signature that is representative of an image sequence also includes information identifying the extent of the image sequence, such as the starting time and/or starting image frame number for the sequence, and the ending time and/or ending image frame number for the sequence. Because an image sequence signature is a proxy representing the associated image sequence, the signatures of two image sequences can be compared to determine whether their respective images are substantially similar or identical. Generally, if two image sequence signatures match or substantially match (e.g., at least within some tolerance or deviation level), then the respective images (or image sequences) they represent are substantially similar or identical. Typically, signature comparison is simpler and requires less processing resources than direct image comparison, and the result is more robust.

Thus, to implement image comparison for audience recognition, the people meter enhancement component 210 of FIG. 3 includes an example signature generator 330, an example signature comparator 335 and an example reference storage 340. The signature generator 330 of the illustrated example generates an image sequence signature representative of the current image sequence obtained by the imaging sensor 225 during a prompting interval. In some examples, the image sequence signature(s) generated by the signature generator 330 during an observation period (e.g., a prompting interval) are each stored in a query signature, also referred to as a query image signature. For example, the signature generator 330 generates a respective image signature for each image included in a current sequence of images obtained by the imaging sensor 225 during a current prompting interval as defined by the trigger signal 220. The imaging sensor 225 may generate a sequence of images, instead of one image, during a prompting interval to account for potential changes in the audience composition, position, environment, etc. In such examples, the signature generator 330 may compare the sequence of generated image signatures to identify unique signatures in the sequence, where each unique signature corresponds to a respective, unique image sequence within the overall sequence of images captured during the current prompting interval. These unique image sequence signature(s), which can include information identifying the starting and ending image frames and/or times defining the respective image sequence for each unique image sequence signature, are retained and the other signatures are discarded. The remaining, unique image sequence signature(s), which are representative of the respective, unique sequence(s) of images obtained by the imaging sensor 225 during a current prompting interval, form the query image signature for the current prompting interval. As such, the query image signature is representative of the overall image sequence obtained during a current observation (e.g., prompting interval), and can include one or more (e.g., unique) image sequence signatures representative of one or more respective (e.g., unique) image sequences making up the overall image sequence for the current observation interval. Further examples of segmenting images into unique image sequences representative of distinct audience scenes, and using image signatures to represent such image sequences/scenes, are discussed in U.S. application Ser. No. 13/431,626, entitled "Scene-Based People Metering for Audience Measurement," which was filed on the same date as the instant application. U.S. application Ser. No. 13/431,626 is incorporated herein by reference in its entirety.

As described above, in some examples, the image capturing process can be performed independently of the trigger signal 220. In such examples, the imaging sensor 225 captures a sequence of images corresponding to the audience scenes over time. The signature generator 330 then generates respective image signatures for the images included in sequence, discards redundant image signatures, and uses the remaining signatures and the query image signatures for subsequent scene recognition processing.

In some examples, an image sequence signature generated by the signature generator 330 corresponds to a set of image histograms of the luminance and/or chrominance values included in the current image sequence (or a key frame representative of the current image sequence) obtained by the imaging sensor 225. Further examples of image sequence signatures that can be generated by the signature generator 330 include, but are not limited to, the examples described in U.S. Patent Publication No. 2011/0243459, entitled "Methods and Apparatus to Detect Differences Between Images" and published on Oct. 6, 2011; U.S. Patent Publication No. 2009/0123025, entitled "Methods and Apparatus to Measure Brand Exposure in Media Stream" and published on May 14, 2009; U.S. Patent Publication No. 2008/0068622, entitled "Methods and Apparatus to Identify Images in Print Advertisements" and published on Mar. 20, 2008; U.S. Publication No. 2006/0153296, entitled "Digital Video Signature Apparatus and Methods for Use with Video Program Identification Systems" and published on Jul. 13, 2006; U.S. Pat. No. 6,633,651, entitled "Method and Apparatus for Recognizing Video Sequences" and issued on Oct. 14, 2003; and U.S. Pat. No. 6,577,346, entitled "Recognizing a Pattern in a Video Segment to Identify the Video Segment" and issued on Jun. 10, 2003. U.S. Patent Publication Nos. 2011/0243459, 2009/0123025, 2008/0068622 and 2006/0153296, and U.S. Pat. Nos. 6,633,651 and 6,577,346, are hereby incorporated by reference in their respective entireties.

In the illustrated example of FIG. 3, the query image signature (or image sequence signature(s)) generated by the signature generator 330 for the current prompting interval is provided to the example signature comparator 335. The signature comparator 335 compares the image sequence signature(s) included in the query image signature to one or more reference signatures stored in the reference storage 340. The reference storage 340 may be implemented by any type of a storage or memory device, a database, etc., such as the mass storage device 728 and/or the volatile memory 714 included in the example processing system 700 of FIG. 7, which is described in greater detail below. The reference signatures stored in the reference storage 340 are image signatures representative of respective one or more reference images, which may also be stored in the reference storage 340. As described above, the reference images depict respective reference audience scenes. The signature comparator 335 can implement any type(s) and/or number of comparison criteria, such as a cross-correlation value, a Hamming distance, etc., to determine whether a query image signature and a reference signature match or substantially match within a particular tolerance level (e.g., which may be predetermined, specified as a configuration parameter or input, etc.).

If the signature comparator 335 determines that a query image signature and a reference signature match (e.g., corresponding to when an image sequence signature included in the query image signature substantially matches a reference signature within a particular tolerance level), then the audience scene depicted in the current image sequence represented by the query signature is deemed to be recognized as corresponding to the reference audience scene depicted in the reference image associated with the matching reference signature. Thus, active audience prompting may be unnecessary. If, however, the signature comparator 335 determines that none of the image signatures in the query image signature match any of the reference signatures, then the audience scene(s) depicted in the current image sequence is(are) deemed to be novel. As a result, the audience 120 is considered to be an unknown audience for which active audience prompting should be performed. Accordingly, the people meter enhancement component 210 of FIG. 3 includes an example people meter controller 345 to control audience prompting by the active people meter component 205 based on the result of the image sequence signature comparison performed by the signature comparator 335.

For example, when a comparison result determined by the signature comparator 335 indicates that the current query image signature for a current prompting interval matches at least one of the reference signatures, the people meter controller 345 can disable audience prompting by the active people meter component 205 during the current prompting interval (e.g., by not asserting the enhanced prompting trigger signal 235 during the current prompting interval). Alternatively, when the comparison result determined by the signature comparator 335 indicates that the query image signature matches at least one of the reference signatures, the people meter controller 345 can reduce a probability that the active people meter component 205 will initiate an audience prompt during the current prompting interval (e.g., by permitting the prompting trigger signal 220 to pass through to the enhanced prompting trigger signal 235, but with a probability less than one, such as 0.1 or some other probability value). Conversely, when the comparison result determined by the signature comparator 335 indicates that the query image signature does not match any of the reference signatures, the people meter controller 345 permits audience prompting to occur during the current prompting interval (e.g. by passing the prompting trigger signal 220 through to the enhanced prompting trigger signal 235).

In other words, the people meter controller 345 of the illustrated example controls the audience prompting performed by the active people meter component 205 based on a first configuration when the comparison result determined by the signature comparator 335 indicates that a query image signature for a current prompting interval does not match at least one of the reference signatures. This first configuration corresponds to, for example, the original audience prompting triggered by the prompting trigger signal 220 provided by the site meter 125. However, when the comparison result determined by the signature comparator 335 indicates that the query image signature matches at least one of the reference signatures, the people meter controller 345 of the illustrated example controls the audience prompting performed by the active people meter component 205 based on a second configuration, which is different from the first configuration. This second configuration specifies that, for example, audience prompting during the current prompting interval is to be disabled, or that audience prompting during the current prompting interval is to be performed with a probability less than one.

To report the audience identification data 240 during a current prompting interval, the people meter enhancement component 210 of FIG. 3 includes an example audience identifier 350. The audience identifier 350 determines the audience identification data 240 to be reported based on the result of the image sequence signature comparison performed by the signature comparator 335. For example, when the comparison result determined by the signature comparator 335 indicates that a query image signature matches at least one of the reference signatures, the audience 120 depicted in the current image sequence has been recognized. Thus, the audience identifier 350 can use the reference audience identification information (e.g., reference demographic information) already associated with the matching reference signature (which is associated with the matching reference image depicting the matching reference audience scene) for audience identification during the current prompting interval. In such cases, the audience identifier 350 retrieves this reference audience identification information from the reference storage 340 and includes it in the audience identification data 240 to be reported during the current prompting interval.

However, when the comparison result determined by the signature comparator 335 indicates that the current query signature does not match any of the reference signatures, the audience 120 depicted in the current image or current sequence of images is unrecognized. Thus, the audience identifier 350 uses the active audience identification data 245 (e.g., active demographic data 245) obtained via the active people meter component 205 for audience identification during the current prompting interval. In such cases, the audience identifier 350 includes the active audience identification data 245 in the audience identification data 240 to be reported during the current prompting interval. Also, in some examples, the audience identifier 350 associates the active audience identification data 245 obtained from the active people meter component 205 with the current query signature and stores the current query signature and the associated audience identification data 245 in the reference storage 340 for use as another reference audience scene signature to be compared with a new sequence of one or more images obtained by imaging sensor 225 during a subsequent prompting interval In the illustrated examples of FIGS. 2 and 3, the prompting trigger signal 220, the enhanced prompting trigger signal 235, the audience identification data 240 and the active audience identification data 245 may be communicated using any type(s), number and/or combination(s) of techniques, including, but not limited to, infrared (IR) transmission, radio frequency transmission, ultrasonic transmission, wired/cabled connection, and the like.

In the preceding examples, the hybrid people meter 130 is described as being used in conjunction with the site meter 125. However, in some example, the hybrid people meter 130 can operate independently of the site meter 125, or without the site meter 125 being present in the audience metering system 100. In such examples, the image trigger 325 can cause the imaging sensor 225 to capture images of the audience scene without being triggered by the trigger signal 220. Each image captured through sensor interface 320 is converted to an image signature by the signature generator 330, as described above.

In some examples, the image signature generated by the signature generator 330 for a currently captured image is compared with a query signature. In such examples, the query signature corresponds to a group of unique video signatures generated previously by the signature generator 330. In some examples, the query signature is initially empty, and when a newly generated signature does not match a signature in the query signature, the generated signature is added to the query signature. However, when a newly generated signature matches any signature in the query signature, the newly generated signature is discarded. Then, when the size of query signature exceeds a certain size (e.g., which may be preconfigured, specified, etc.), or when an observation time period has expired (e.g., which may be preconfigured, specified, etc.), the people meter enhancement component 210 starts to match the image signatures included in the query signature with the reference scene signatures stored in reference storage 340.

In such examples, if the query signature does not match any of the reference scene signatures, the people meter enhancement component 210 determines that novel scenes are being observed. When novel scenes are observed, the people meter enhancement component 210 invokes the active people meter component 205 (e.g., via the enhanced prompting trigger signal 235) to prompt the audience 120 presented in audience area 115. Then, when the active people meter component 205 receives the audience identification information from the audience 120, it forwards the information to the people meter enhancement component 210. In some examples, if the people meter enhancement component 210 does not receive the audience identification information within a time window, the query signature being processed is associated with null information, which indicates the current scenes being processed are associated with no audience. This information is entered into reference storage 340, with the current audience being set to no audience. Otherwise, the query signature being processed is associated with the audience identification information obtained from the active people meter component 205, which indicates that the current scenes being processed are associated with this specific audience composition. This information is entered into the reference storage 340, and the current audience is identified using the information received from active people meter component 205.

However, when the query signature matches one or more reference signatures from the storage 340, the people meter enhancement component 210 determines that repeated audience scenes (or, in other words, a repeat of a previously processed scene) have been observed. For repeated scenes, the current audience 120 can be identified using reference audience information associated with the matching reference scene signature(s). No further help from the active meter 205 is needed. In some examples, the people meter enhancement component 210 still requests the active people meter component 205 to prompt the audience 120 when, for example, the results of matching yields inconsistent audience information, when the matching quality is not strong, when it is determined to be a time for verification based on some predetermined probability, etc. In some examples, when the hybrid people meter 130 is implemented in accordance with the preceding discussion, the hybrid people meter 130 performs audience identification processing continuously, and can return identification information for the current audience 120 whenever the site meter 125 queries for this information.

While example manners of implementing the hybrid people meter 130 of FIG. 1 have been illustrated in FIGS. 2-3, one or more of the elements, processes and/or devices illustrated in FIGS. 2-3 may be combined, divided, rearranged, omitted, eliminated and/or implemented in any other way. Further, the example active people meter component 205, the example people meter enhancement component 210, the example input interface 215, the example imaging sensor 225, the example sensor interface 320, the example image trigger 325, the example signature generator 330, the example signature comparator 335, the example reference storage 340, the example people meter controller 345, the example audience identifier 350 and/or, more generally, the example hybrid people meter 130 of FIGS. 2-3 may be implemented by hardware, software, firmware and/or any combination of hardware, software and/or firmware. Thus, for example, any of the example active people meter component 205, the example people meter enhancement component 210, the example input interface 215, the example imaging sensor 225, the example sensor interface 320, the example image trigger 325, the example signature generator 330, the example signature comparator 335, the example reference storage 340, the example people meter controller 345, the example audience identifier 350 and/or, more generally, the example hybrid people meter 130 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example hybrid people meter 130, the example active people meter component 205, the example people meter enhancement component 210, the example input interface 215, the example imaging sensor 225, the example sensor interface 320, the example image trigger 325, the example signature generator 330, the example signature comparator 335, the example reference storage 340, the example people meter controller 345 and/or the example audience identifier 350 are hereby expressly defined to include a tangible computer readable medium such as a memory, digital versatile disk (DVD), compact disk (CD), Blu-ray Disc™, etc., storing such software and/or firmware. Further still, the example hybrid people meter 130 of FIGS. 2-3 may include one or more elements, processes and/or devices in addition to, or instead of, those illustrated in FIG. 2-3, and/or may include more than one of any or all of the illustrated elements, processes and devices.

Figure 4:
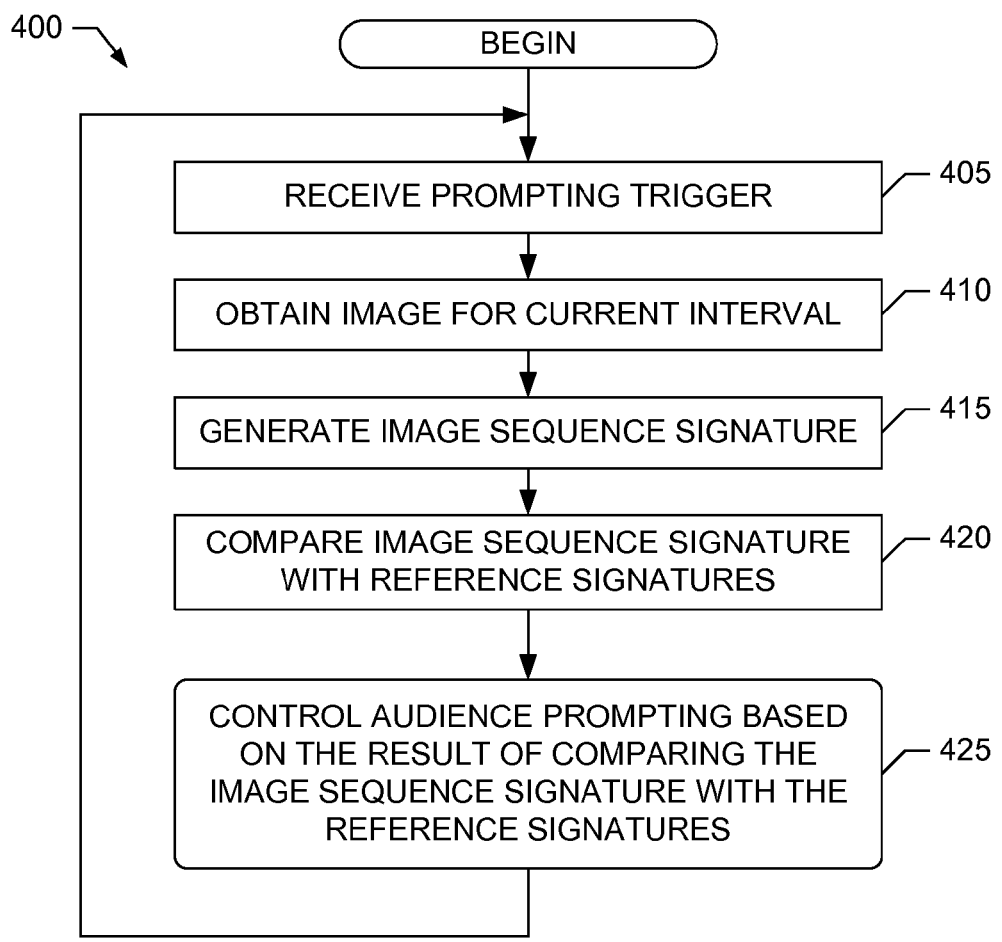
FIG. 4 is a flowchart representative of first example machine readable instructions that may be executed to implement the example hybrid people meters of FIGS. 2 and/or 3 for use in the example audience measurement system of FIG. 1.
Figure 5:
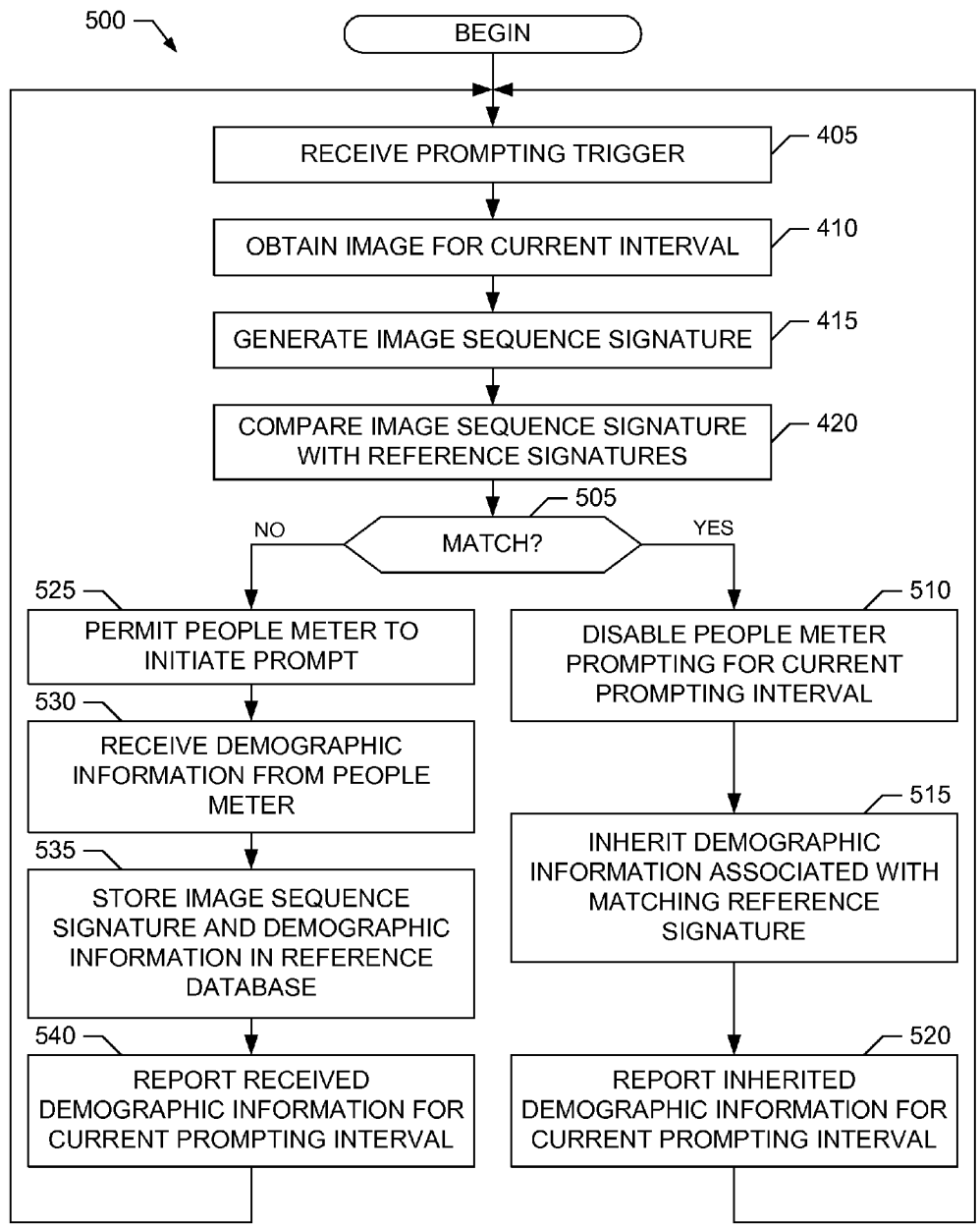
FIG. 5 is a flowchart representative of second example machine readable instructions that may be executed to implement the example hybrid people meters of FIGS. 2 and/or 3 for use in the example audience measurement system of FIG. 1
Figure 6:
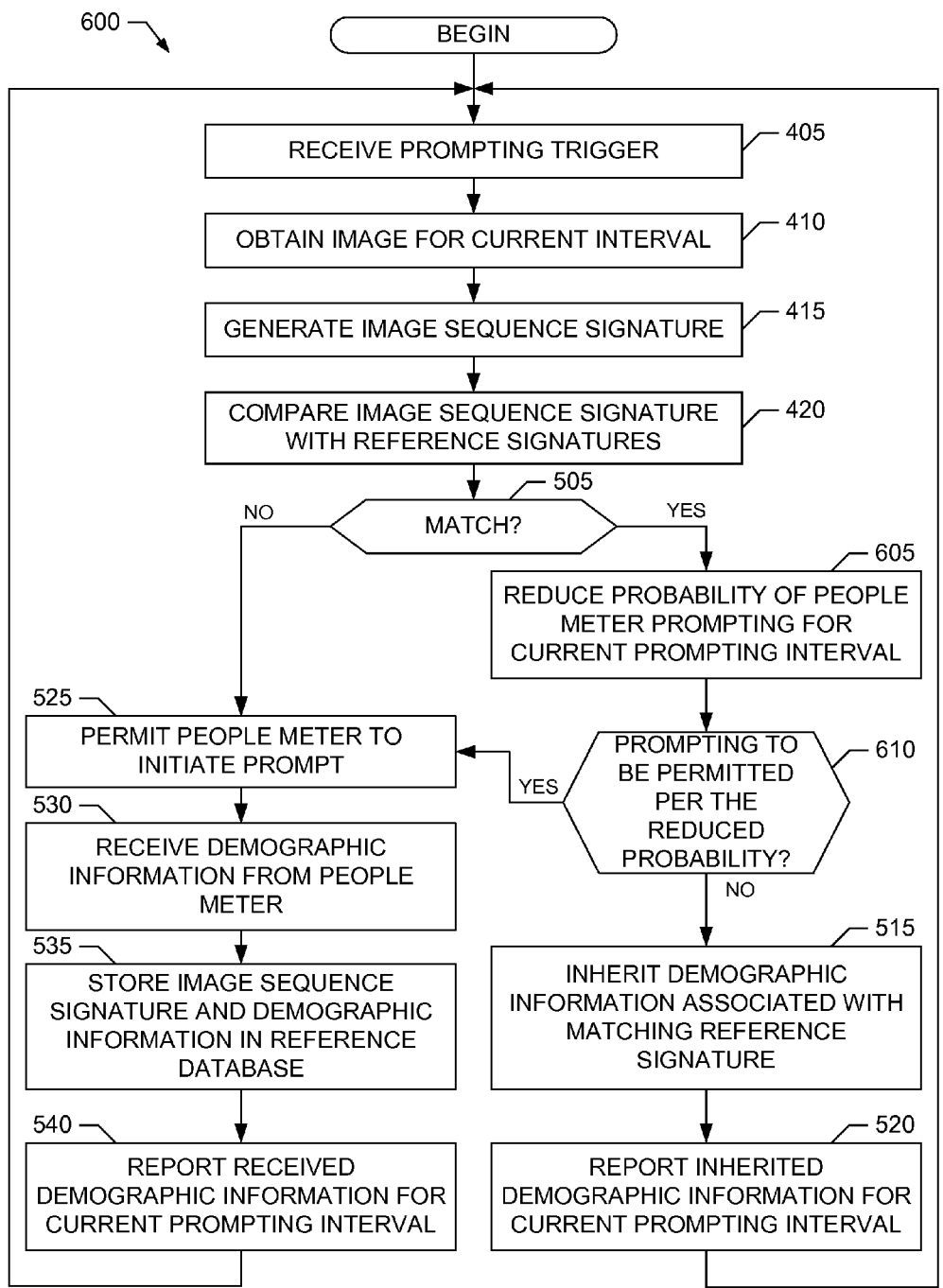
FIG. 6 is a flowchart representative of third example machine readable instructions that may be executed to implement the example hybrid people meters of FIGS. 2 and/or 3 for use in the example audience measurement system of FIG. 1.

Flowcharts representative of example machine readable instructions for implementing the example hybrid people meter 130, the example active people meter component 205, the example people meter enhancement component 210, the example input interface 215, the example imaging sensor 225, the example sensor interface 320, the example image trigger 325, the example signature generator 330, the example signature comparator 335, the example reference storage 340, the example people meter controller 345 and/or the example audience identifier 350 are shown in FIGS. 4-6. In these examples, the machine readable instructions represented by each flowchart may comprise one or more programs for execution by a processor, such as the processor 712 shown in the example processing system 700 discussed below in connection with FIG. 7. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 712, but the entire program or programs and/or portions thereof could alternatively be executed by a device other than the processor 712 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 4-6 may be implemented manually. Further, although the example machine readable instructions are described with reference to the flowcharts illustrated in FIGS. 4-6, many other methods of implementing the example hybrid people meter 130, the example active people meter component 205, the example people meter enhancement component 210, the example input interface 215, the example imaging sensor 225, the example sensor interface 320, the example image trigger 325, the example signature generator 330, the example signature comparator 335, the example reference storage 340, the example people meter controller 345 and/or the example audience identifier 350 may alternatively be used. For example, with reference to the flowcharts illustrated in FIGS. 4-6, the order of execution of the blocks may be changed, and/or some of the blocks described may be changed, eliminated, combined and/or subdivided into multiple blocks.

As mentioned above, the example processes of FIGS. 4-6 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4-6 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/ or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Example machine readable instructions 400 that may be executed to implement the example hybrid people meter 130 of FIGS. 1, 2 and/or 3 are represented by the flowchart shown in FIG. 4. The example machine readable instructions 400 may be executed at predetermined intervals, based on an occurrence of a predetermined event, etc., or any combination thereof. For convenience and without loss of generality, the example machine readable instructions 400 are described in the context of execution by the hybrid people meter 130 of FIG. 3 in the audience measurement system 100 of FIG. 1. With reference to the preceding figures, the machine readable instructions 400 of FIG. 4 begin execution at block 405 at which the image trigger 325 of the enhancement component 210 of the hybrid people meter 130 receives an asserted prompting trigger signal 220 from the site meter 125 of the audience measurement system 100, which indicates the start of the current audience prompting interval, as described above. At block 410, the image trigger 325 triggers the sensor interface 320 of the people meter enhancement component 210 to cause its imaging sensor 225 to obtain a sequence of one or more images of the audience area 115 for the current prompting interval. As described above, the image(s) obtained at block 410 depict scene(s) in which an audience (e.g., the audience 120) is expected to be present. At block 415, the signature generator 330 of the people meter enhancement component 210 generates query image signature(s) representative of the image(s) obtained at block 410, as described above.

At block 420, the signature comparator 335 of the people meter enhancement component 210 compares the query image signature(s) generated at block 415 with a set of reference signatures retrieved from the reference storage 340 to determine a comparison result. As described above, the reference signatures are representative of reference images depicting reference audience scenes previously identified by the hybrid people meter 130. Thus, the comparison result determined at block 420 indicates whether the audience 120 depicted in the current image sequence can be inferred from the previous known/reference scenes or is to be determined using the active component 205. At block 425, the people meter controller 345 controls audience prompting performed by the active component 205 of the hybrid people meter 130 by, for example, generating the enhanced prompting trigger signal 235 based on the comparison result determined by the signature comparator 335 at block 420. For example, and as described above, the people meter controller 345 may permit audience prompting to occur according to the prompting trigger signal 220 when the comparison result indicates that the audience 120 depicted in the current image sequence cannot be inferred because the image sequence is novel, whereas when the comparison result indicates that the audience 120 depicted in the current image sequence can be inferred from the previous (e.g., reference) image sequences, the people meter controller 345 may block audience prompting or permit audience prompting to still occur (e.g., to verify the reference audience identification information associated with the matching reference audience). Processing then returns to block 405 and blocks subsequent thereto to enable audience recognition and identification to be performed during a subsequent prompting interval.

Second example machine readable instructions 500 that may be executed to implement the example hybrid people meter 130 of FIGS. 1, 2 and/or 3 are represented by the flowchart shown in FIG. 5. The example machine readable instructions 500 may be executed at predetermined intervals, based on an occurrence of a predetermined event, etc., or any combination thereof. For convenience and without loss of generality, the example machine readable instructions 500 are described in the context of execution by the hybrid people meter 130 of FIG. 3 in the audience measurement system 100 of FIG. 1. Also, FIG. 5 includes blocks 405-420 from FIG. 4. Accordingly, the processing performed by the example machine readable instructions 500 at these blocks is described in detail above in connection with the discussion of FIG. 4 and, in the interest of brevity, is not repeated in the discussion of FIG. 5.

With reference to the preceding figures, the machine readable instructions 500 of FIG. 5 begin execution at block 405 and perform the processing at blocks 405 through 420 as described above in connection with the description of the machine readable instructions 400 of FIG. 4. Thus, after completion of the processing at block 420, the signature comparator 335 of the enhancement component 210 of the hybrid people meter 130 has determined a result of comparing the query image signature representative of the current image sequence (e.g., depicting the audience 120) with the set of reference signatures, which are representative of the set of reference images depicting the set of reference audiences previously identified by the hybrid people meter 130. Next, at block 505 the signature comparator 335 determines whether the query image signature representative of the current image sequence matches at least one of the reference signatures (e.g., corresponding to at least one of the image sequence signatures in the query image signature matching at least one of the reference signatures). If a query image signature matches a reference signature (block 505), then at block 510 the people meter controller 345 of the people meter enhancement component 210 disables audience prompting by the active people meter component 205 during the current prompting interval. For example, the people meter controller 345 can disable audience prompting by blocking the prompting trigger signal 220 received from the site meter 125 from being passed through to the enhanced prompting trigger signal 235 provided to the active people meter component 205, as described above.

At block 515, the audience identifier 350 of the people meter enhancement component 210 retrieves, from the reference storage 340, the reference audience identification information (e.g., reference demographic information) that has been associated with the matching reference signature. At block 515, the audience identifier 350 inherits or otherwise uses the reference audience identification information to infer the audience 120 depicted in the image sequence for the current prompting interval, as described above. At block 520, the audience identifier 350 reports the audience identification data 240 for the current prompting interval, which includes the reference audience identification information that has been associated with the audience 120 depicted in the current image sequence, as described above.

However, if the query image signature does not match any of the reference signatures (block 505), then at block 525 the people meter controller 345 permits audience prompting by the active people meter component 205 during the current prompting interval. For example, the people meter controller 345 can enable audience prompting by passing the prompting trigger signal 220 received from the site meter 125 through to the enhanced prompting trigger signal 235 provided to the active people meter component 205, as described above. At block 530, the audience identifier 350 receives the active audience identification data 245 (e.g., demographic data 245) generated by the active people meter component 205 during the current prompting interval. As described above, the active audience identification data 245 is obtained from the audience 120 via the input interface 215 in response to an audience prompt triggered by the active people meter component 205. At block 535, the audience identifier 350 associates the active audience identification data 245 with the query signature of the current image sequence. At block 535, the audience identifier 350 also stores the current query signature and audience identification in the reference storage 340 to be used as reference information for comparison with a new image sequence obtained during a subsequent prompting interval. At block 540, the audience identifier 350 reports the audience identification data 240 for the current prompting interval, which includes the active audience identification data 245 that has been associated with the audience 120 depicted in the current image, as described above. Processing then returns to block 405 and blocks subsequent thereto to enable audience recognition and identification to be performed during a subsequent prompting interval.

Third example machine readable instructions 600 that may be executed to implement the example hybrid people meter 130 of FIGS. 1, 2 and/or 3 are represented by the flowchart shown in FIG. 6. The example machine readable instructions 600 may be executed at predetermined intervals, based on an occurrence of a predetermined event, etc., or any combination thereof. For convenience and without loss of generality, the example machine readable instructions 600 are described in the context of execution by the hybrid people meter 130 of FIG. 3 in the audience measurement system 100 of FIG. 1. Also, FIG. 6 includes blocks 405-420 from FIG. 4, and blocks 505 and 515-540 from FIG. 5. Accordingly, the processing performed by the example machine readable instructions 600 at these blocks is described in detail above in connection with the discussions of FIGS. 4-5 and, in the interest of brevity, is not repeated in the discussion of FIG. 6.

With reference to the preceding figures, the machine readable instructions 600 of FIG. 6 begin execution at block 405 and perform the processing at blocks 405 through 420 as described above in connection with the description of the machine readable instructions 400 of FIG. 4. Thus, after completion of the processing at block 420, the signature comparator 335 of the enhancement component 210 of the hybrid people meter 130 has determined a result of comparing the query image signature representative of the current image sequence (e.g., depicting the audience 120) with the set of reference signatures, which are representative of the set of reference images depicting the set of reference audiences previously identified by the hybrid people meter 130. Next, at block 505 the signature comparator 335 determines whether the query image signature representative of the current image sequence matches at least one of the reference signatures. If the query image signature does not match any of the reference signatures (block 505), then the processing at blocks 525 through 540 is performed. As described above in connection with the description of the machine readable instructions 400 of FIG. 4, the processing at blocks 525 through 540 causes the audience 120 depicted in the current image to be identified via active audience prompting performed by the active component 205 of the hybrid people meter 130.

However, if current query image signature does match at least one of the reference signatures (block 505), then at block 605 the people meter controller 345 of the people meter enhancement component 210 reduces the probability that the active people meter component 205 will initiate an audience prompt during the current prompting interval. For example, and as described above, the people meter controller 345 can reduce the probability of audience prompting during the current prompting interval by permitting the prompting trigger signal 220 to pass through to the enhanced prompting trigger signal 235, but gated with a probability less than one. In some examples, the people meter controller 345 can use a random number generator to gate whether the prompting trigger signal 220 is passed through to the enhanced prompting trigger signal 235 with the specified or configured probability. If audience prompting ends up being blocked by the people meter controller 345 during the current prompting interval (block 610), then the processing at blocks 515 and 520 is performed. As described above in connection with the description of the machine readable instructions 400 of FIG. 4, the processing at blocks 515 and 520 causes the audience 120 depicted in the current image to be identified using the reference audience identification information already associated with the reference signature that matched the current image sequence signature. However, if audience prompting ends up being permitted by the people meter controller 345 during the current prompting interval (block 610), then the processing at blocks 525 through 540 is performed to enable the audience 120 depicted in the current image to be identified via active audience prompting performed by the active component 205 of the hybrid people meter 130, as described above. Processing then returns to block 405 and blocks subsequent thereto to enable audience recognition and identification to be performed during a subsequent prompting interval.

Figure 7:
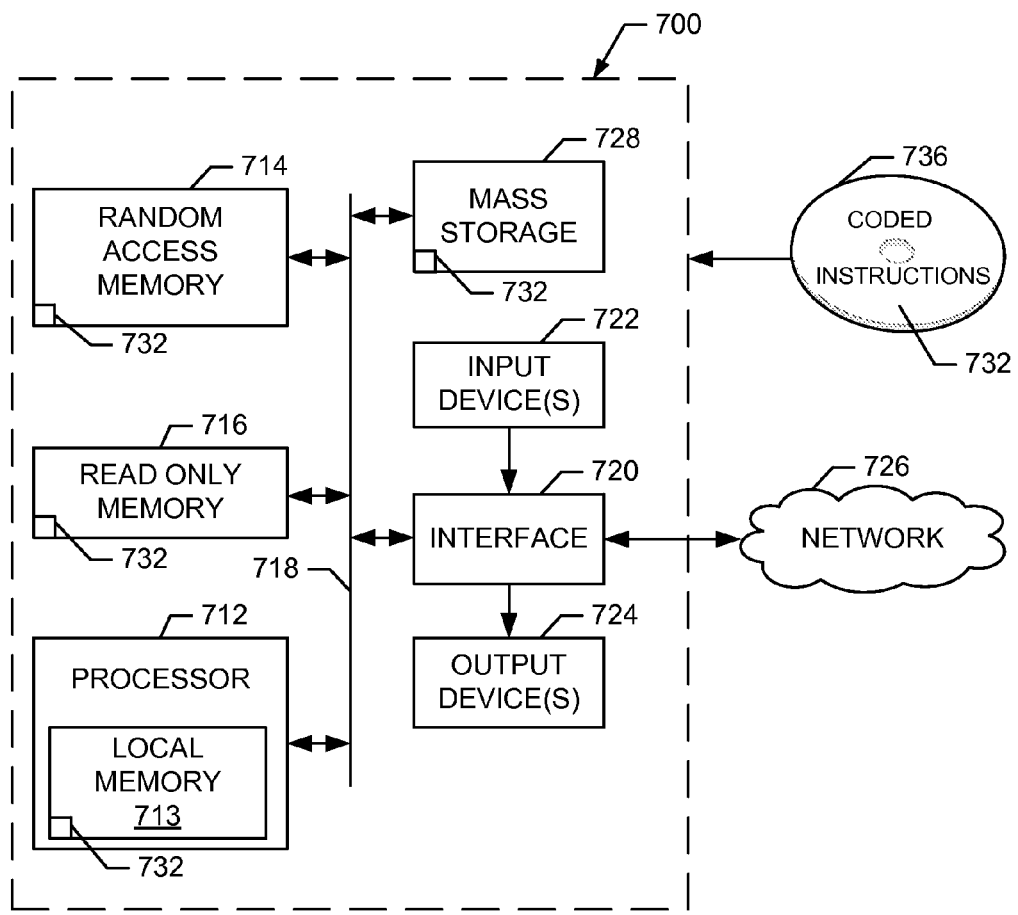
FIG. 7 is a block diagram of an example processing system that may execute the example machine readable instructions of FIGS. 4, 5 and/or 6 to implement the example hybrid people meters of FIGS. 2 and/or 3, and/or the example audience measurement system of FIG. 1.

FIG. 7 is a block diagram of an example processing system 700 capable of executing the instructions of FIGS. 4-6 to implement the example hybrid people meter 130, the example active people meter component 205, the example people meter enhancement component 210, the example input interface 215, the example imaging sensor 225, the example sensor interface 320, the example image trigger 325, the example signature generator 330, the example signature comparator 335, the example reference storage 340, the example people meter controller 345 and/or the example audience identifier 350 of FIGS. 1-3. The processing system 700 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 700 of the instant example includes a processor 712. For example, the processor 712 can be implemented by one or more microprocessors and/or controllers from any desired family or manufacturer.

The processor 712 includes a local memory 713 (e.g., a cache) and is in communication with a main memory including a volatile memory 714 and a non-volatile memory 716 via a bus 718. The volatile memory 714 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processing system 700 also includes an interface circuit 720. The interface circuit 720 may be implemented by any type of interface standard, such as an Ethernet interface, a universal serial bus (USB), and/or a PCI express interface.

One or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, a trackbar (such as an isopoint), a voice recognition system and/or any other human-machine interface.

One or more output devices 724 are also connected to the interface circuit 720. The output devices 724 can be implemented, for example, by display devices (e.g., a liquid crystal display, a cathode ray tube display (CRT)), a printer and/or speakers. The interface circuit 720, thus, typically includes a graphics driver card.

The interface circuit 720 also includes a communication device, such as a modem or network interface card, to facilitate exchange of data with external computers via a network 726 (e.g., an Ethernet connection, a digital subscriber line (DSL), a telephone line, coaxial cable, a cellular telephone system, etc.).

The processing system 700 also includes one or more mass storage devices 728 for storing machine readable instructions and data. Examples of such mass storage devices 728 include floppy disk drives, hard drive disks, compact disk drives and digital versatile disk (DVD) drives. In some examples, the mass storage device 728 may implement the reference storage 340. Additionally or alternatively, in some examples the volatile memory 714 may implement the reference storage 340.

Coded instructions 732 corresponding to the instructions of FIGS. 4-6 may be stored in the mass storage device 728, in the volatile memory 714, in the non-volatile memory 716, in the local memory 713 and/or on a removable storage medium, such as a CD or DVD 736.

As an alternative to implementing the methods and/or apparatus described herein in a system such as the processing system of FIG. 7, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An audience identification method comprising:
   detecting, by executing an instruction with a processor, an already asserted trigger signal being provided by an output of a media device meter;
   in response to determining, by executing an instruction with the processor, that an image captured by an image sensor does not correspond to any one of a plurality of recognized audiences, passing the already asserted trigger signal from the output of the media device meter to an input of a people meter to cause the people meter to output a prompt for entry of audience identification information; and
   in response to determining, by executing an instruction with the processor, that the image corresponds to a first one of the plurality of recognized audiences, blocking the already asserted trigger signal from being passed from the output of the media device meter to the input of the people meter to prevent the people meter from outputting the prompt.

2. The method of claim 1, further including triggering the image sensor to capture the image based on the trigger signal.

3. The method of claim 1, wherein the trigger signal is a first trigger signal, and further including triggering the image sensor to capture the image based on a second trigger signal independent of the first trigger signal.

4. The method of claim 1, wherein the image is a first image included in a sequence of images captured by the image sensor, the passing of the asserted trigger signal from the output of the media device meter to the input of the people meter is in response to determining none of the images corresponds to any one of the plurality of recognized audiences, and the blocking of the asserted trigger signal from being passed from the output of the media device meter to the input of the people meter is in response to determining the first image of the sequence of images corresponds to the first one of the plurality of recognized audiences.

5. The method of claim 4, further including:
   determining the first image of the sequence of images corresponds to the first one of the plurality of recognized audiences when an image signature included in a sequence of image signatures representative of the sequence of images matches a reference signature representative of a reference image corresponding to the first one of the plurality of recognized audiences; and determining none of the images corresponds to any one of the plurality of recognized audiences when none of the image signatures matches any of a plurality of reference signatures representative of a respective plurality of reference images corresponding to the plurality of recognized audiences.

6. The method of claim 1, further including, when the image is determined to correspond to the first one of the plurality of recognized audiences, passing the asserted trigger signal from the output of the media device meter to the input of the people meter, instead of blocking the asserted trigger signal, in response to determining an audience verification condition has been met.

7. The method of claim 6, wherein the audience verification condition is based on a probability.

8. A tangible computer readable medium comprising computer readable instructions which, when executed, cause a processor to at least:
  detect an already asserted trigger signal that is provided by an output of a media device meter;
  in response to determining that an image captured by an image sensor does not correspond to any one of a plurality of recognized audiences, pass the already asserted trigger signal from the output of the media device meter to an input of a people meter to cause the people meter to output a prompt for entry of audience identification information; and
  in response to determining that the image corresponds to a first one of the plurality of recognized audiences, block the already asserted trigger signal from being passed from the output of the media device meter to the input of the people meter to prevent the people meter from outputting the prompt.

9. The tangible computer readable medium of claim 8, wherein the instructions, when executed, further cause the processor to trigger the image sensor to capture the image based on the trigger signal.

10. The tangible computer readable medium of claim 8, wherein the trigger signal is a first trigger signal, and the instructions, when executed, further cause the processor to trigger the image sensor to capture the image based on a second trigger signal independent of the first trigger signal.

11. The tangible computer readable medium of claim 8, wherein the image is a first image included in a sequence of images captured by the image sensor, the instructions, when executed, cause the processor to pass the asserted trigger signal from the output of the media device meter to the input of the people meter in response to determining none of the images corresponds to any one of the plurality of recognized audiences, and the instructions, when executed, cause the processor to block the asserted trigger signal from being passed from the output of the media device meter to the input of the people meter in response to determining the first image of the sequence of images corresponds to the first one of the plurality of recognized audiences.

12. The tangible computer readable medium of claim 11, wherein the instructions, when executed, further cause the processor to:
  determine the first image of the sequence of images corresponds to the first one of the plurality of recognized audiences when an image signature included in a sequence of image signatures representative of the sequence of images matches a reference signature representative of a reference image corresponding to the first one of the plurality of recognized audiences; and
  determine none of the images corresponds to any one of the plurality of recognized audiences when none of the image signatures matches any of a plurality of reference signatures representative of a respective plurality of reference images corresponding to the plurality of recognized audiences.

13. The tangible computer readable medium of claim 8, wherein when the image is determined to correspond to the first one of the plurality of recognized audiences, the instructions, when executed, further cause the processor to pass the asserted trigger signal from the output of the media device meter to the input of the people meter, instead of blocking the asserted trigger signal, in response to determining an audience verification condition has been met.

14. The tangible computer readable medium of claim 13, wherein the audience verification condition is based on a probability.

15. An audience identification apparatus comprising:
  an image sensor; and
  a controller to:
    detect an already asserted trigger signal that is provided by an output of a media device meter;
    in response to determining that an image captured by the image sensor does not correspond to any one of a plurality of recognized audiences, pass the already asserted trigger signal from the output of the media device meter to an input of a people meter to cause the people meter to output a prompt for entry of audience identification information; and
    in response to determining that the image corresponds to a first one of the plurality of recognized audiences, block the already asserted trigger signal from being passed from the output of the media device meter to the input of the people meter to prevent the people meter from outputting the prompt.

16. The audience identification apparatus of claim 15, further including an image trigger to trigger the image sensor to capture the image based on the trigger signal.

17. The audience identification apparatus of claim 15, wherein the trigger signal is a first trigger signal, and further including an image trigger to trigger the image sensor to capture the image based on a second trigger signal independent from the first trigger signal.

18. The audience identification apparatus of claim 15, wherein the image is a first image included in a sequence of images captured by the image sensor, the controller is to pass the asserted trigger signal from the output of the media device meter to the input of the people meter in response to determining the sequence of images does not correspond to any one of the plurality of recognized audiences, and the controller is to block the asserted trigger signal from being passed from the output of the media device meter to the input of the people meter in response to determining the sequence of images corresponds to the first one of the plurality of recognized audiences.

19. The audience identification apparatus of claim 18, wherein the controller is further to:
  determine the sequence of images corresponds to the first one of the plurality of recognized audiences when an image signature included in a sequence of image signatures representative of the sequence of images matches a reference signature representative of a reference image corresponding to the first one of the plurality of recognized audiences; and determine the sequence of images does not correspond to any one of the plurality of recognized audiences when none of the image signatures matches any of a plurality of reference signatures representative of a respective plurality of reference images corresponding to the plurality of recognized audiences.

20. The audience identification apparatus of claim 15, wherein when the image is determined to correspond to the first one of the plurality of recognized audiences, the controller is further to pass the asserted trigger signal from the output of the media device meter to the input of the people meter, instead of blocking the asserted trigger signal, in response to determining an audience verification condition has been met.

\* \* \* \* \*